United States Patent
Vidalenc et al.

(10) Patent No.: US 9,342,820 B2
(45) Date of Patent: May 17, 2016

(54) METHOD FOR MANAGING E-MAIL ATTACHMENTS IN AN EMAIL IN AN EMAIL APPLICATION

(75) Inventors: Bruno Vidalenc, Massy (FR); Laurent Ciavaglia, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 13/502,831

(22) PCT Filed: Oct. 11, 2010

(86) PCT No.: PCT/FR2010/052138
§ 371 (c)(1),
(2), (4) Date: Jul. 3, 2012

(87) PCT Pub. No.: WO2011/048301
PCT Pub. Date: Apr. 28, 2011

(65) Prior Publication Data
US 2012/0265817 A1    Oct. 18, 2012

(30) Foreign Application Priority Data
Oct. 19, 2009  (FR) ...................................... 09 05019

(51) Int. Cl.
*G06F 15/16*   (2006.01)
*G06F 7/04*    (2006.01)
*G06Q 10/10*   (2012.01)

(52) U.S. Cl.
CPC .................................. *G06Q 10/107* (2013.01)

(58) Field of Classification Search
USPC ....................................................... 709/206
See application file for complete search history.

(56) References Cited

U.S. PATENT DOCUMENTS

| | | | |
|---|---|---|---|
| 2002/0143691 A1* | 10/2002 | Ramaley et al. | 705/37 |
| 2004/0034688 A1* | 2/2004 | Dunn | 709/206 |
| 2004/0064733 A1* | 4/2004 | Gong | 713/201 |
| 2004/0068545 A1* | 4/2004 | Daniell et al. | 709/206 |
| 2004/0153462 A1* | 8/2004 | Bardwell | 707/100 |
| 2005/0060375 A1* | 3/2005 | Ernest et al. | 709/206 |
| 2005/0193068 A1 | 9/2005 | Brown et al. | |
| 2005/0266494 A1* | 12/2005 | Hodge | 435/6 |
| 2006/0031309 A1* | 2/2006 | Luoffo et al. | 709/206 |
| 2006/0075228 A1* | 4/2006 | Black et al. | 713/167 |
| 2006/0085508 A1 | 4/2006 | Uchida et al. | |
| 2007/0016613 A1* | 1/2007 | Foresti et al. | 707/104.1 |
| 2007/0239802 A1* | 10/2007 | Razdow et al. | 707/203 |
| 2009/0100346 A1* | 4/2009 | O'Sullivan et al. | 715/743 |

OTHER PUBLICATIONS

International Search Report for PCT/FR2010/052138 dated Jan. 28, 2011.

* cited by examiner

*Primary Examiner* — Emmanuel L Moise
*Assistant Examiner* — Mahran Abu Roumi
(74) *Attorney, Agent, or Firm* — Fay Sharpe LLP

(57) ABSTRACT

The invention proposes a method for managing email attachments in an email application, said method used, on opening an attachment using an editing application defined based on the nature of said attachment, to edit a copy of said attachment and to save the modifications made to said copy as a modified version of said attachment, said method also allowing a logical link to be created between the modified version and the email, said logical link being used to attach said modified version to said email as a modified attachment.

11 Claims, 1 Drawing Sheet

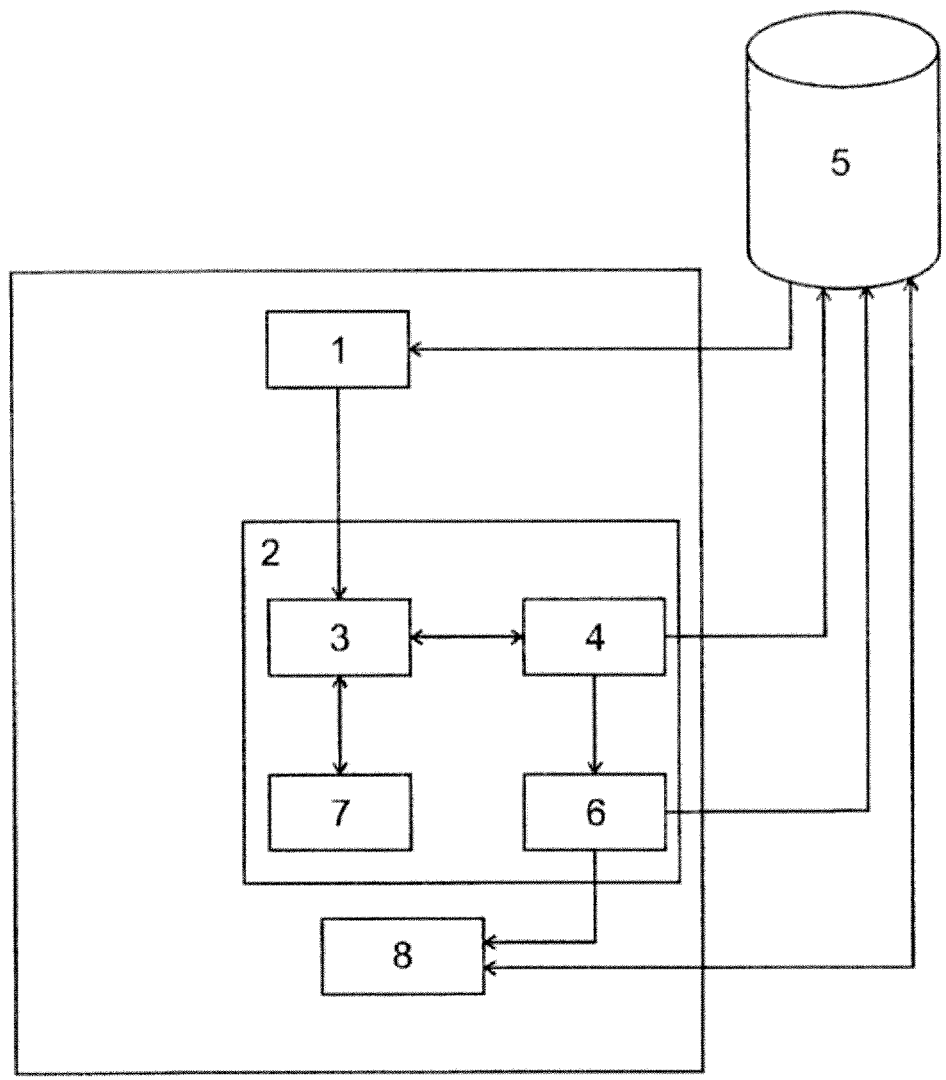

METHOD FOR MANAGING E-MAIL ATTACHMENTS IN AN EMAIL IN AN EMAIL APPLICATION

The invention relates to a method for managing email attachments in an email application, as well as an email application comprising the means to implement such a method.

When a user of an email application receives an email with an attachment, he or she may need to modify said attachment to make his or her contribution.

A traditional email application, however, does not account for modifications to attachments and always shows the email with the original document. Moreover, the modified attachment is stored by default in a temporary folder in the system folder, and may then be lost when re-opening the original attachment.

To remedy this problem, a user may choose to save the original attachment to a personal folder, so as to be able to safely modify said attachment and easily find it again later. So as to differentiate the modified attachment from the original, the user must then be sure to save said modified attachment under a different name.

Moreover, if he or she wishes to reply to the sender of the email to share the modifications he or she made to the original attachment and/or forward said email with the modified attachment to other recipients, he or she must also be sure to include the correct attachment with the email to be sent, with the risk of making a mistake, especially if he or she must repeat these operations for several emails and/or several attachments.

The user may also choose to account for the default behaviour of the email application and thus attempt to search for the temporary file on his or her terminal where attachment modifications are saved, with the risk that they may be definitively lost.

The lack of a link between a modified attachment and its original version is therefore one of the main faults of a traditional email application, as the user loses time searching for a file stored in an insecure storage location that is difficult to access, and in repeating operations to save, rename files, and attach an attachment to an email, with the risk of making handling errors.

The invention aims to improve the prior art by making it possible for the user of an email application to modify and securely save the modifications made to email attachments while avoiding time lost in repeating tedious operations. The invention also makes it possible to facilitate and increase security in replying to and/or forwarding an email containing a modified attachment.

To that end, according to a first aspect, the invention proposes a method for managing attachments to an email in an email application, said method used, on opening an attachment using an editing application defined based on the nature of said attachment, to edit a copy of said attachment and to save the modifications made to said copy as a modified version of said attachment, said method also allowing a logical link to be created between the modified version and the email, said logical link being used to attach said modified version to said email as a modified attachment.

According to a second aspect, the invention proposes an email application comprising:
The means to open an email attachment using an editing application determined according to the nature of said attachment;
An attachment management module comprising:
The means to edit a copy of said attachment after opening it;
The means to save the modifications made to said copy as a modified version of said attachment;
The means to create a logical link between the modified version and the email, said logical link making it possible to attach said modified version to said email as a modified attachment.

Other features and advantages of the invention will become apparent in the description below with reference to the attached drawing, which illustrates a functional architecture for an email application according to the invention.

In relation to this FIGURE, the method for managing email attachments in an email application is described below. The email application may be installed locally on the user terminal, such as Microsoft Outlook®. The email application may also be located on a remote server, or be provided by an Internet site, such as Gmail® or Yahoo Mail®.

The email application comprises the means 1 to open an email attachment using an editing application determined according to the nature of said attachment. For example if the attachment is a .doc file, the editing application may be a version of the Microsoft Word® or OpenOffice.org Writer® word processing applications.

The email application comprises an email management module 2, said module comprising the means 3 to edit a copy of the attachment after opening it, and the means 4 to save the modifications made to said copy as a modified version of said attachment.

The means 4 save the modified version of the attachment in the folder 5 of the email application in which attachments to emails received are saved. Therefore the user may save the various modified versions of his or her attachments in a secure and permanent folder.

The folder 5 may be located in any system folder accessible by the email application. It may, for example, be located on the hard drive of the user terminal, or in a storage area provided by a remote server or a network.

Additionally, the method plans that the modified version of an attachment be automatically saved upon closing the editing application, so that the user does not have to carry out additional handling, therefore reducing the risk of losing said modified version. The user thus only has to close the editing application after having made all the desired modifications to the copy of the attachment, for said modifications to be saved.

The module 2 also comprises the means 6 to create a logical link between the modified version of an attachment and the email that contains said attachment, said logical link making it possible to attach said modified version to said email as a modified attachment.

The logical link created by the means 6 may take several forms and depends both on the system and the email application. According to one embodiment, the means 6 create the logical link by giving parameters to the editing application to specify to said application that the modified version of the copy edited by the means 3 must be saved in the folder 6 and linked to the email containing the original attachment.

According to another embodiment, the logical link may consist of a hook making it possible to save a path to the modified attachment and to automatically link said modified attachment to the folder 5 when the user has finished his or her modifications.

Then, the user can easily access his or her received and modified attachments through the emails to which said attachments are linked. The method plans therefore to display an email with its received and modified attachments, said modified attachments being shown in a way that distinguishes them from the received attachments.

A modified attachment may be placed in an email next to the attachment received with said email, with a visual marker, for example a transparent effect, applied to its icon to distinguish it from the received attachment. Thus, the user can directly and visually distinguish the modified attachment from the original attachment.

The method may also plan for a modified attachment to be named in the email by changing the name of the original attachment.

To do this, according to one embodiment, the module 2 comprises an iterative variable function 7 making it possible to name the modified attachment by modifying the name of the original attachment, for example by adding to said name a number corresponding to the number of the copy edited by the means 3 of the module 2.

In particular, when the attachment opened by the means 1 of the email application is itself a modified version of a received attachment, the function 7 changes the name of said attachment by replacing the number in said name with the next consecutive number.

The link created between a modified version of an attachment and an email makes it possible to make the modified version available for the entire lifespan of said email. In particular, the modified version is automatically linked to an email reply operation, or to a forwarding operation for said email, so that the user does not have to manually attach said modified version to said email, thus limiting time lost and the risk of errors.

Additionally, to prevent losing a modified attachment saved in the folder 5, the email application may comprise the means 8 to issue a special alert when an email containing at least one modified attachment is about to be deleted. The user can then decide to save the modified attachment(s) in another folder or to delete said attachment(s) with the email.

The invention claimed is:

1. A computer-implemented method for managing attachments to an email in an email application, said method comprising:
   opening an original email attachment via an editing application based on the nature of said email attachment;
   processing edits to a copy of said original email attachment;
   saving modifications made to said copy during editing as a modified version of said original email attachment in a folder of the email application in which email attachments received are saved;
   creating a logical link between the modified version of said attachment saved in the folder and the email, said logical link being used to attach said modified version of said original email attachment to said email as a modified email attachment, wherein the email application is installed locally on a user terminal, the email application is located on a remote server, or the email application is provided via the internet;
   displaying an email with one or more original email attachments received and one or more modified email attachments, said modified email attachments being shown in a way that distinguishes them from the received original email attachments
   wherein the logical link is created to save the modified version of said attachment in the email application folder in which attachments received are recorded,
   wherein parameters are provided to the editing application for modifying said attachment to specify that said modified version must be saved in the email application folder in which attachments received are recorded and linked to the email with the attachment of origin or the logical link acts as a connector to keep track of the attachment modified and automatically link a modified attachment to the email application folder when a user has finished making modifications to said attachment,
   wherein the modified version of said original email attachment is automatically saved upon closing the editing application.

2. The computer-implemented method for managing email attachments according to claim 1, wherein the modified email attachment is named in the email by changing the name of the original email attachment.

3. The computer-implemented method for managing attachments according to claim 1, wherein the modified version of said original email attachment is automatically linked to an email reply operation or to a forwarding operation for said email.

4. The computer-implemented method for managing attachments according to claim 1, further comprising issuing a special alert when an email containing at least one modified email attachment is about to be deleted.

5. An apparatus comprising:
   a processor; and
   memory storing instructions that, when executed, cause a computer to:
   open an original email attachment using an editing application according to the nature of said original email attachment;
   process edits to a copy of said original email attachment after opening it;
   save the modifications made to said copy as a modified version of said attachment in a folder of the email application in which email attachments received are saved;
   create a logical link between the modified version and the email saved in the folder, said logical link making it possible to attach said modified version to said email as a modified attachment;
   display an email with one or more original email attachments received and one or more modified email attachments, said modified email attachments being shown in a way that distinguishes them from the received original email attachments,
   wherein the logical link is created to save the modified version of said attachment in the email application folder in which attachments received are recorded,
   wherein parameters are provided to the editing application for modifying said attachment to specify that said modified version must be saved in the email application folder in which attachments received are recorded and linked to the email with the attachment of origin or the logical link acts as a connector to keep track of the attachment modified and automatically link a modified attachment to the email application folder when a user has finished making modifications to said attachment,
   wherein the modified version of said original email attachment is automatically saved upon closing the editing application.

6. The apparatus according to claim 5, wherein the instructions further include naming the modified attachment by changing the name of the original attachment.

7. The apparatus according to claim 5, wherein the instructions further include issuing a special alert when an email containing at least one modified attachment is about to be deleted.

8. A non-transitory computer-usable data carrier storing instructions that, when executed by a computer, cause the computer to perform a method for managing attachments to an email in an email application, said method comprising:
opening an original email attachment using an editing application based on the nature of said email attachment;
processing edits a copy of said original email attachment;
saving modifications made to said copy during editing as a modified version of said original email attachment in a folder of the email application in which email attachments received are saved;
creating a logical link between the modified version of said attachment and the email saved in the folder, said logical link being used to attach said modified version of said original email attachment to said email as a modified email attachment;
displaying an email with one or more original email attachments received and one or more modified email attachments, said modified email attachments being shown in a way that distinguishes them from the received original email attachments,
wherein the logical link is created to save the modified version of said attachment in the email application folder in which attachments received are recorded,
wherein parameters are provided to the editing application for modifying said attachment to specify that said modified version must be saved in the email application folder in which attachments received are recorded and linked to the email with the attachment of origin or the logical link acts as a connector to keep track of the attachment modified and automatically link a modified attachment to the email application folder when a user has finished making modifications to said attachment,
wherein the modified version of said original email attachment is automatically saved upon closing the editing application.

9. The non-transitory computer-usable data carrier according to claim 8, wherein the modified email attachment is named in the email by changing the name of the original email attachment.

10. The non-transitory computer-usable data carrier according to claim 8, wherein the modified version of said original email attachment is automatically linked to an email reply operation or to a forwarding operation for said email.

11. The non-transitory computer-usable data carrier according to claim 8, said method further comprising issuing a special alert when an email containing at least one modified email attachment is about to be deleted.

* * * * *